(12) United States Patent
Faber

(10) Patent No.: US 7,116,474 B2
(45) Date of Patent: *Oct. 3, 2006

(54) IN VITRO FERTILIZATION MICROSCOPE

(75) Inventor: Lothar K. Faber, Short Hills, NJ (US)

(73) Assignee: Kramer Scientific Corporation, Valley Cottage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,855

(22) Filed: Jul. 19, 2005

(65) Prior Publication Data
US 2005/0248838 A1 Nov. 10, 2005

Related U.S. Application Data

(63) Continuation of application No. 10/464,637, filed on Jun. 19, 2003, now Pat. No. 6,930,828.

(60) Provisional application No. 60/390,118, filed on Jun. 21, 2002.

(51) Int. Cl.
G02B 21/18 (2006.01)

(52) U.S. Cl. .................................. 359/381; 359/376
(58) Field of Classification Search ................ 359/368, 359/376, 381, 821
See application file for complete search history.

(56) References Cited

U.S. PATENT DOCUMENTS

| | | | | |
|---|---|---|---|---|
| 3,994,558 | A * | 11/1976 | Schulz et al. | 359/377 |
| 4,697,893 | A * | 10/1987 | Fehr et al. | 359/377 |
| 6,226,118 | B1 * | 5/2001 | Koyama et al. | 359/380 |
| 6,598,972 | B1 | 7/2003 | Strahle | |
| 6,930,828 | B1 * | 8/2005 | Faber | 359/381 |
| 2003/0058530 | A1 | 3/2003 | Kawano | |
| 2003/0137724 | A1 | 7/2003 | Tonooka | |
| 2004/0224878 | A1 | 11/2004 | Cukurcam et al. | |

* cited by examiner

Primary Examiner—Mark A. Robinson
(74) Attorney, Agent, or Firm—Sughrue Mion, PLLC

(57) ABSTRACT

A dual stereo-compound microscope that is enabled to change between stereoscopic observation and compound observation while illuminating a sample with illumination. While shifting between a stereoscopic view and a compound view, the sample being viewed remains parcenter and parfocal.

10 Claims, 2 Drawing Sheets

IN VITRO FERTILIZATION MICROSCOPE

This is a continuation of Application No. 10/464,637 filed Jun. 19, 2003, now U.S. Pat. No. 6,930,828, which claims benefit of Provisional Application No. 60/390,118 filed Jun. 21, 2002, the entire disclosure of which is incorporated herein by reference.

FIELD OF THE INVENTION

This application claims benefit of U.S. Provisional Application No. 60/390,118, filed Jun. 21, 2002; the disclosure of which is incorporated herein by reference. This invention relates to microscopes for viewing samples in biological procedures, such as for in vitro fertilization techniques, or for other uses wherein there is a need to alternate the view of the sample between two dimensions and three dimensions while using a cold light source for illumination.

BACKGROUND OF THE INVENTION

Microscopes are well known for the human observance of biological processes and procedures. The invention of the microscope is variously accredited to Zacharias Janssen, a Dutch spectaclemaker, c. 1590, and to Galileo, who announced his invention in 1610. Today's compound microscope is widely used in bacteriology, biology and medicine for the scrutiny of extremely miniscule objects such as bacteria, unicellular organisms, and the cells and tissue of plants and animals. Some compound microscopes are capable of resolving objects as small as 5000 Angstroms and some electron wave microscopes (e.g. scanning tunneling microscopes) are capable of viewing objects even as small as a single Angstrom. The microscope has been extremely important in the development of the biological sciences.

One area of biological science to benefit immensely from the microscope is the area of in vitro fertilization (IVF). Modem IVF has helped numerous women to achieve their dream of bearing children. Modem IVF is also used to help replicate endangered animal species as well as for animal husbandry in general.

Fraught with challenges, however, the procedures required of the IVF laboratory are extremely tedious, delicate, time and labor intensive, in addition to being costly due to the previous considerations. While being handled delicately, eggs are selected and injected with sperm. Heretofore, this task of selection and injection has been accomplished with two microscopes on different platforms, as explained below.

After being harvested, eggs are placed in Petri dishes and stored in incubators.

Later, the Petri dishes with the eggs are removed to heated platforms for observance beneath a stereoscopic dissecting microscope where they are stereoscopically examined, cleaned and selected. The Petri dishes with the eggs are then returned to the incubators and later transported to a different heated platform for observance beneath a compound microscope for injection with sperm.

The previous procedure is often perilous to the eggs. A major cause for failure is the requirement of continual handling and re-handling of the specimens. Each time a dish of eggs is handled and moved, the eggs are in imminent danger of damage, contamination or destruction, whether from changes in temperature or from inadvertent human clumsiness. The slightest damage to the eggs can result in a failed IVF.

SUMMARY OF THE INVENTION

Accordingly, it is a general object of the present invention to provide a microscope which limits the perils and potential harms described above, in addition to overcoming other disadvantages of the prior art.

It is also an object of the present invention to provide a microscope for viewing samples stereoscopically or compoundly. The microscope includes a stereo objective; a compound objective; an objective changer for objective changeover, the objective changeover enabling the switch between the stereo objective and the compound objective or between the compound objective and the stereo objective in a viewing path of the microscope; a microscope body; and a cold light source for providing illumination for use with both the stereo objective and the compound objective.

It is a further object of the present invention to provide a microscope having a mirror system for stereoscopic viewing and a condenser system for compound viewing.

It is yet a further object of the present invention to provide a microscope having a mirror system with a two-sided mirror with a first side that is high gloss and a second side that is frosted.

It is an additional object of the present invention to provide a stereo objective that is upright in relation to the microscope body and a compound objective that is inverted in relation to the microscope body, as well as further including manipulators and injectors capable of advancing into and retracting from an optical path.

Additionally, it is an object of the present invention to provide a microscope including a heated stage capable of holding a plurality of Petri dishes and having a heated stage including a safety lip at the outer peripheral edges of the heated stage, the safety lip prohibiting accidental dislodge of any Petri dish located on the heated stage.

It is yet a further object of the present invention to provide a microscope including a prism mechanism capable of being positioned in the path of a single-axis image for creating binocular images from a single-axis image.

It is yet an additional object of the present invention to provide an optical microscope system that permits at least two optical viewing techniques. The optical viewing techniques include: means for viewing samples in three dimensions and means for viewing samples in two dimensions. Both optical viewing techniques include means for enabling a cold light for illumination.

It is yet a further object of the present invention to provide an optical system wherein a means for viewing in three dimensions includes at least one stereoscopic objective and a means for viewing in two dimensions includes at least one compound objective.

It is additionally an object of the present invention to provide a microscope for viewing samples including: stereo objective means for viewing sample stereoscopically; compound objective means for viewing samples compoundly; objective change means for changing between the stereo objective means and the compound objective means; a microscope body; and a cold light source means for providing illumination for both the stereo objective means and the compound objective means.

It is yet another object of the present invention to provide a microscope wherein the sample being viewed remains in the viewing field and in focus before, during and after an objective change.

BRIEF DESCRIPTION OF THE DRAWINGS

The invention, both as to its organization and manner of operation, may be further understood by reference to the drawings that include FIGS. 1 and 2, taken in connection with the following descriptions.

DETAILED DESCRIPTION OF PREFERRED EMBODIMENTS OF THE INVENTION

The following description of illustrative non-limiting embodiments of the present invention discloses specific configurations and components. However, the embodiments are merely examples of the present invention and are not limiting. The specific features described below are merely used to describe such embodiments and to provide an overall understanding of the present invention. Accordingly, one skilled in the art will readily recognize that the present invention is not limited to the specific embodiments described below. Furthermore, the descriptions of various configurations and components of the present invention that are known to one skilled in the art are omitted for the sake of clarity and brevity.

Figure 1:
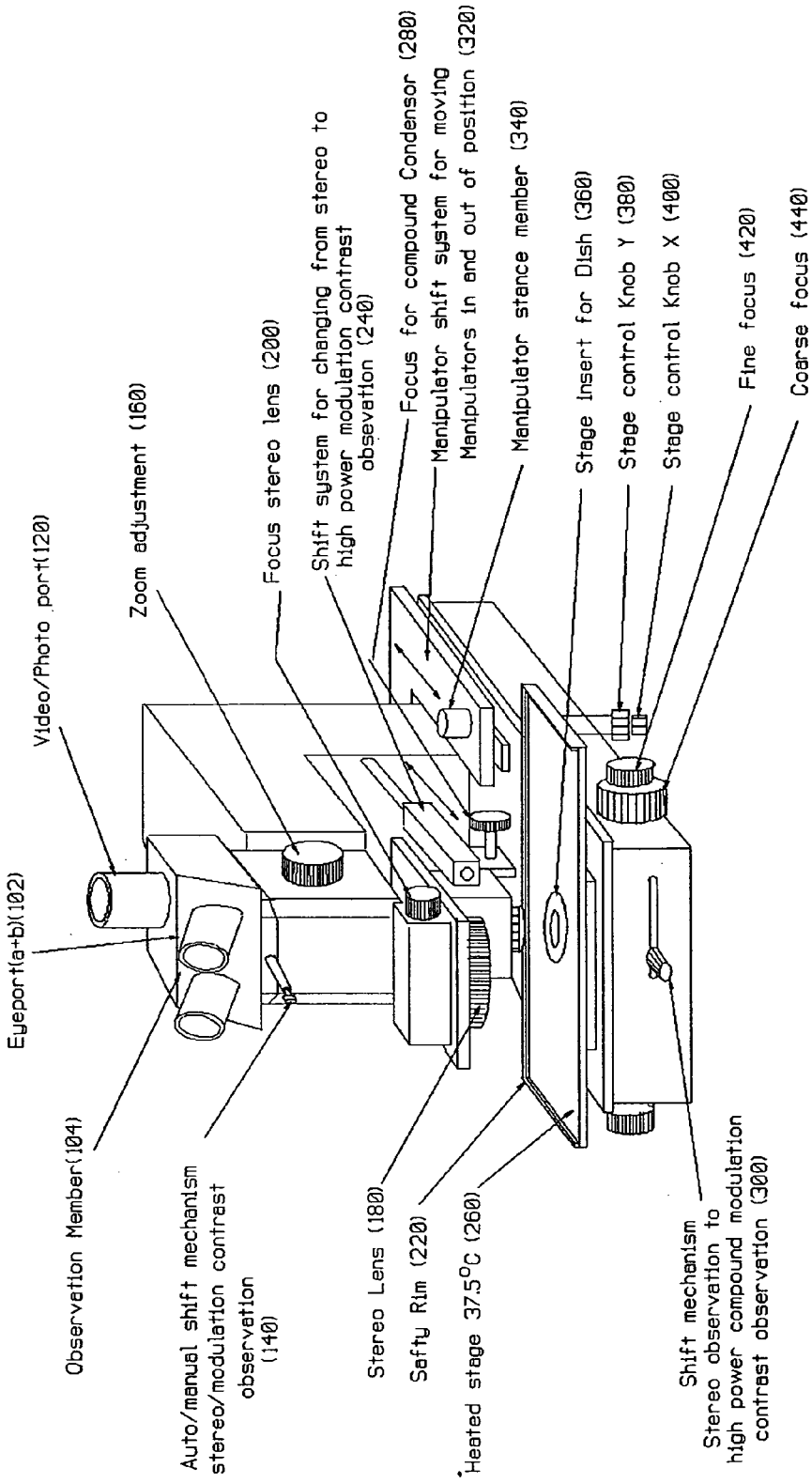
FIG. 1 is an illustration of an external view of an embodiment of the present invention including controls and components.

FIG. 1 is an illustration of a non-limiting, preferred embodiment of the dual stereo-compound IVF microscope. An observation member 104 is provided near a top portion of the dual stereo-compound IVF microscope 100 and includes an eye port 102(a) for a right eye and an eye port 102(b) for a left eye. The observation member 104 also includes a video/photo port 120. The observation member 104 allows for real-time observation (as in direct human observation) via the eye ports 102(a) and 102(b), as well as for recorded observation via the video/photo port 120 (including still photography or videography means, in analog or digital forms).

The dual stereo-compound IVF microscope 100 also includes an auto/manual shift mechanism 140 which allows either automatic or manual selection between stereoscopic and compound modulation contrast observations. While auto/manual shift mechanism 140 operates mechanically in a non-limiting, preferred embodiment, auto/manual shift mechanism 140 may also be operated by an electric motor, air pneumatics, liquid hydraulics or a combination of the previous. Furthermore, the shift mechanism 140, while shown as a switch, could also be a button, knob, or other actuator control.

The dual stereo-compound IVF microscope 100 also includes a zoom adjust 160. The zoom adjust 160 operates in conventional fashion, moving a lens or lens group in relation to a fixed lens or lens group, altering the magnification as it appears in the video/photo port 120 or the eye ports 102(a–b).

The dual stereo-compound IVF microscope 100 includes the capability of viewing a sample in either of a stereoscopic or compound mode. That is, while viewing a sample and without the need to move the sample, a user can alternate back and forth between viewing modes, for example, from stereoscopic viewing to compound viewing or vice versa. In a further non-limiting embodiment, fluorescent accessories may be added to the system, enabling the ability to alternate back and forth between illumination sources, for example, from fluorescent illumination to brightfield illumination or vice versa, also without moving the sample.

The dual stereo-compound IVF microscope 100 permits viewing a sample and alternating the viewing mode while the sample remains parcenter and parfocal. That is, the viewing sample remains centered and focused before, during and after the change from one viewing mode to the next, and back again.

The previously noted duality of viewability is enabled by shift system 240, which shifts the stereoscopic objective lens 180 (or lens 560 in FIG. 2, as explained in greater detail herein) into and out of the viewing/observation path. In stereoscopic observation mode, the optical viewing/observation path extends in a straight, vertical direction from the top area of observation member 104 to the sample being viewed, with the stereoscopic objective lens 180 (560) in-between. This process is explained in greater detail in relation to FIG. 2, herein, including the description of a condenser lens 590 and titling mirror 580.

The focus of the stereo lens is adjusted using the focus stereo lens adjustment knob 200. The focus of the condenser lens 590 (FIG. 2) is adjusted using the focus compound lens adjustment knob 280. While the focus stereo lens adjustment knob 200 and the focus compound lens adjustment knob 280 are both shown as knobs moveable in at least two directions, one of ordinary skill in the art would recognize that the knobs may alternatively be buttons, levers or other actuators moveable in a multiplicity of directions.

A further non-limiting characteristic is shown by the manipulator/injector shift system 320, which moves manipulators and injectors in and out of the viewing path area of the dual stereo-compound IVF microscope 100. The manipulators are used in stereoscopic observation mode for examination, selection and cleaning of the eggs. The manipulators are used again along with the injectors in compound observation mode for injecting sperm into the eggs. In instances where the manipulators are used, manipulator stance member 340 holds the manipulators in a position from which the manipulator is able to pivot and rotate within a prescribed range of motion.

Another embodiment of the present invention includes a heated stage 260, which keeps specimens supplied thereon within about 37.5 degrees Celsius (or approximately within 0.1 degrees Celsius of a set temperature). The heated stage 260 provides the warmth needed by the eggs to remain viable. The heated stage 260 further includes a safety rim 220, which keeps Petri dishes located thereon from accidentally dislodging and thereby becoming damaged.

In the center of the heated stage 260 is the dish insert 360, wherein Petri dishes are inserted so as to be directly within the viewing/observation area of the dual stereo-compound IVF microscope 100. The heated stage 260 is moveable in at least two directions through the use of stage control knobs "Y" 380 and "X" 400. The first knob 380 moves the heated stage 260 in a direction along the "Y" axis and the second knob 400 moves the heated stage 260 in a direction along the "X" axis, for ease of sample observation/viewing. While both knobs 380 and 400 are shown as knobs moveable in at least two directions, one of ordinary skill in the art would recognize that the knobs may alternatively be buttons, levers or other actuators moveable in a multiplicity of directions.

Another aspect of the invention includes the fine focus knob 420 and the coarse focus knob 440. Both knobs are used to focus the image of the sample being viewed in the viewing/observation path of the dual stereo-compound IVF microscope 100. While both knobs 420 and 440 are shown as knobs moveable in at least two directions, one of ordinary skill in the art would recognize that the knobs may alternatively be buttons, levers or other actuators moveable in a multiplicity of directions. Both knobs 420, 440 may also be motorized.

Another embodiment of the present invention is shown by the manual shift mechanism 300 which allows for manual selection between stereoscopic and compound modulation contrast observations. While the manual shift mechanism 300 operates mechanically in a non-limiting, preferred embodiment, it may also be operated by electric motor, air pneumatics, liquid hydraulics or a combination of the previous. Furthermore, the manual shift mechanism 300, while shown as a lever, could also be a button, knob, switch or other actuator control.

Figure 2:
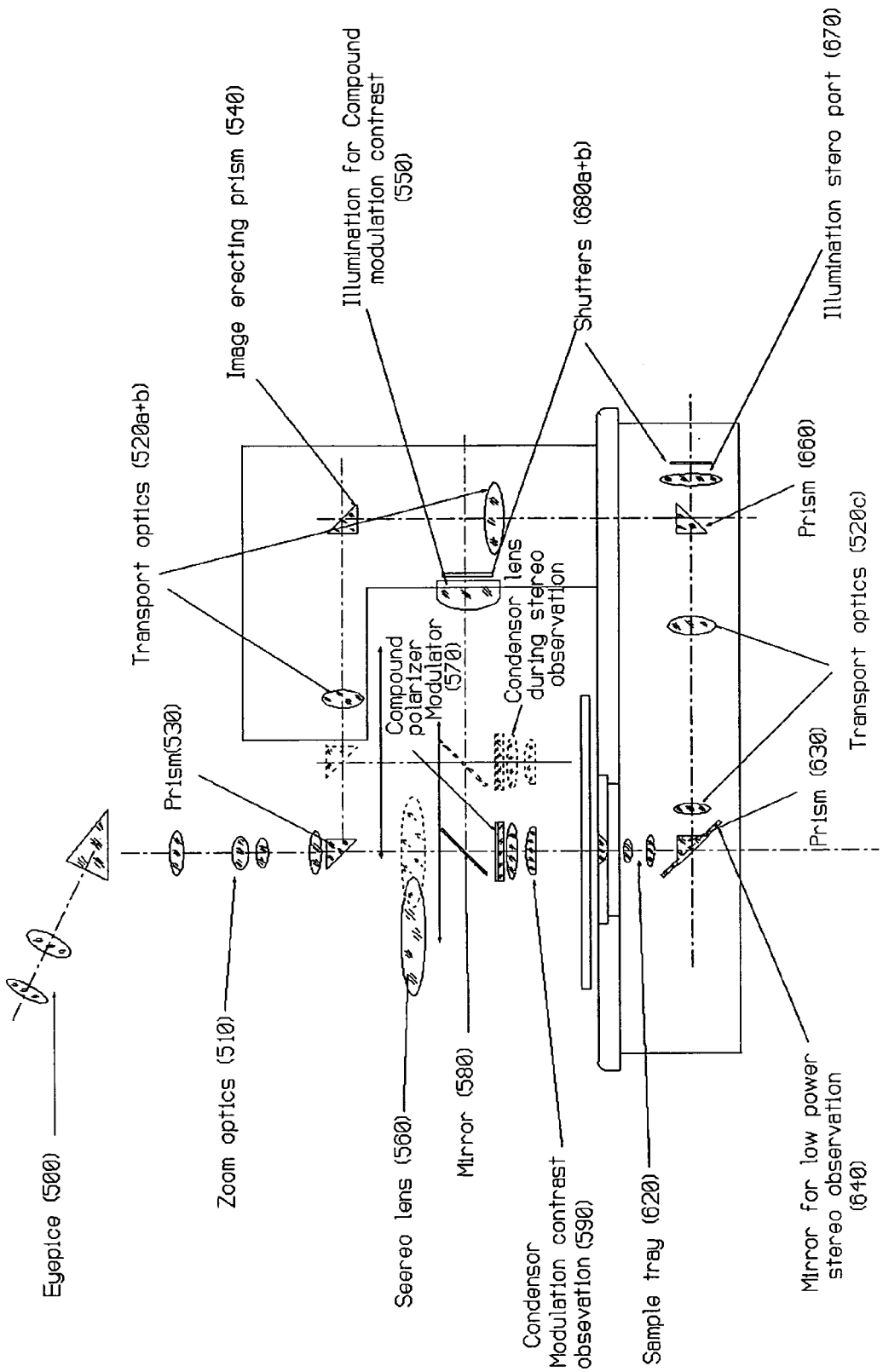
FIG. 2 is an example of internal optics and controls used in accordance with an illustrative, non-limiting embodiment of the invention.

FIG. 2 illustrates another embodiment of the present invention including optics internal to a dual stereo-compound IVF microscope. Alternative viewing/observation paths with multiple axes are shown. One such viewing/observation path is used for stereoscopic observation of samples. Another viewing/observation path is used for compound observation of samples.

A first viewing path, used for stereoscopic observation, progresses from the eyepiece 500, through the zoom optics 510 (which operate in conventional fashion in that a lens or lens group is moveable in relation to a fixed lens or lenses, thereby being capable of changing the magnification of the sample as it is viewed through eyepiece 500) and the stereo lens 560 to the sample being viewed on sample tray 600 and comprises both a right and a left optical path.

Stereo lens 560 is shiftable using the shift system 240 (as described in relation to FIG. 1) and shifts in conjunction with prism 530, mirror 580, compound polarizer modulator 570, and condenser lens 590. When stereo lens 560 is in the viewing path, the compound polarizer modulator 570, mirror 580 and condensor lens 590 are shifted out of a second viewing path used for compound observation, and vice versa.

Cold illumination for use during stereoscopic viewing arrives at illumination stereo port 670 through shutter 680a. In a preferred method, the cold illumination arrives via fiber optic line. When shutter 680a is open, light travels to mirror 640, where it is reflected to a vertical direction, illuminating the sample from beneath and wherein the sample is being viewed from the top of dual stereo-compound IVF microscope 100.

The second viewing path, used for compound observation, also begins at eyepiece 500 and then travels through the zoom optics 510, which operate in conventional fashion in that a lens or lens group is moveable in relation to a fixed lens or lenses, thereby being capable of changing the magnification of the sample as it is viewed through eyepiece 500. The second viewing path is diverted from the vertical and dual axes as provided at the eyepiece 500 to a horizontal and singular axis by prism 530. That is, prism 530 not only directs the optical path from vertical to horizontal, but also splits the previously singluar axis to dual axes for binocular viewing at eyepiece 500.

Transport optics 520a propagates the single axis image between prism 530 and image directing prism 540. At image directing prism 540, the single axis image is diverted from the horizontal to the vertical along transport optics 520b. The second viewing path extends to image directing prism 660, where the viewing path changes again from the vertical to the horizontal and is transported by transport optics 520c. The second viewing path once more changes from the horizontal to the vertical at prism 630, where the viewing path runs through the compound objective modulation contrast 620, the sample on sample tray 600 and the compound condenser objective 590.

Cold illumination for use during compound viewing arrives at illumination stereo port 550 through shutter 680b. In a preferred method, the cold illumination arrives via fiber optic line. When shutter 680b is open, light travels to mirror 580, where it is reflected to a vertical direction, illuminating the sample from above and wherein the sample is being viewed from the bottom of dual stereo-compound IVF microscope 100 in a fashion inverted to how a stereoscopic sample is viewed in the dual stereo-compound IVF microscope 100.

The above embodiments clearly have various advantages over the prior art. Advantageous characteristics in the embodiments of the present invention include: a reduction in time and labor in that the eggs may be observed for all procedures beneath one microscope; a reduction in the amount of space needed in the laboratory in that only one platform is necessary versus two platforms; enhanced security and safety for the eggs in that they are handled fewer times, lessening the risk of human mistake, clumsiness or inadvertence; and, further, a cost reduction in that one microscope platform is less expensive and cheaper to maintain than two microscope platforms.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. For example, some or all of the features of the different embodiments discussed above may be deleted from the embodiment. Therefore, the present invention is not intended to be limited to the embodiments described herein but is to be accorded the widest scope defined only by the claims below and equivalents thereof.

What is claimed is:

1. A microscope comprising:
 a microscope body;
 a stereo objective mounted to the microscope body;
 a compound objective mounted to the microscope body; wherein
 the stereo objective and the compound objective may be alternately used for alternatively viewing a sample stereoscopically and compoundly, respectively;
 wherein the microscope includes a first and a second viewing path; and
 wherein the first viewing path is used for stereoscopic observation through the stereo objective and the second viewing path is used for compound observation through the compound objective; and
 further comprising a mirror system mounted to the microscope body and capable of moving into the first viewing path for stereoscopic observation and further capable of moving out of the first viewing path for compound observation.

2. The microscope of claim 1, wherein the stereo objective is shifted into the first viewing path for stereoscopic observation and the stereo objective is shifted out of said first viewing path for said compound observation.

3. The microscope of claim 1, further comprising at least one cold light source providing illumination for both the stereo objective and the compound objective.

4. The microscope of claim 1, wherein the stereo objective is upright in relation to the microscope body and the compound objective is inverted in relation to the microscope body.

5. The microscope of claim 1, further comprising a condenser system mounted to the microscope body and capable of moving into the second viewing path for compound observation and further capable of moving out of the second viewing path for stereoscopic observation.

6. The microscope of claim 1, wherein the mirror system comprises a two-sided mirror with a first side that is high gloss and a second side that is frosted.

7. The microscope of claim 1, further comprising manipulators and injectors mounted to the microscope body and capable of being positioned in at least one of the viewing paths of the microscope.

8. The microscope of claim 1, further comprising a heated stage mounted to the microscope body and positioned in at least one of the viewing paths of the microscope, the heated stage capable of holding a plurality of Petri dishes.

9. The microscope of claim 8, wherein the heated stage comprises a safety lip at outer peripheral edges of the heated stage, the safety lip prohibiting accidental dislodge of any Petri dish located on the heated stage.

10. The microscope of claim 1, further comprising a prism mechanism capable of being positioned in the path of a single-axis image for creating binocular images from the single-axis image.

* * * * *